(12) United States Patent
Bacchus et al.

(10) Patent No.: US 12,505,679 B2
(45) Date of Patent: Dec. 23, 2025

(54) ROAD SIGN INTERPRETATION SYSTEM EMPLOYING PERCEPTUAL HASHING AND GEOLOCATIONAL CACHING

(71) Applicant: GM Global Technology Operations LLC, Detroit, MI (US)

(72) Inventors: Brent Navin Roger Bacchus, Sterling Heights, MI (US); Alireza Esna Ashari Esfahani, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 18/184,226

(22) Filed: Mar. 15, 2023

(65) Prior Publication Data

US 2024/0312221 A1 Sep. 19, 2024

(51) Int. Cl.
| | |
|---|---|
| *G06T 7/10* | (2017.01) |
| *G06F 40/40* | (2020.01) |
| *G06V 20/58* | (2022.01) |
| *G06V 30/10* | (2022.01) |

(52) U.S. Cl.
CPC ............ *G06V 20/582* (2022.01); *G06F 40/40* (2020.01); *G06T 7/10* (2017.01); *G06V 30/10* (2022.01)

(58) Field of Classification Search
CPC .... G06V 20/582; G06V 30/10; G06V 20/588; G06V 10/74; G06F 40/40; G06T 7/10
See application file for complete search history.

(56) References Cited

U.S. PATENT DOCUMENTS

| | | | | |
|---|---|---|---|---|
| 2015/0332104 A1* | 11/2015 | Kapach | ............... | G06V 20/582 |
| | | | | 382/104 |
| 2020/0019639 A1* | 1/2020 | Zhang | .................. | G06F 16/285 |
| 2021/0172744 A1* | 6/2021 | Raut | ....................... | G06N 5/04 |

FOREIGN PATENT DOCUMENTS

CN 108918532 A * 11/2018 ......... G01N 21/8851

OTHER PUBLICATIONS

Baek, et al., "What Is Wrong With Scene Text Recognition Model Comparisons? Dataset and Model Analysis," 2019 IEEE/CVF International Conference on Computer Vision (ICCV), 2019, pp. 4714-4722, doi: 10.1109/ICCV.2019.00481.

(Continued)

*Primary Examiner* — Huo Long Chen
(74) *Attorney, Agent, or Firm* — Vivacqua Crane, PLLC (57) ABSTRACT

A road sign interpretation system includes a perceptual cache storing perceptual hash values that each correspond to image data representing a road sign. Each road sign that corresponds to one of the perceptual hash values stored in the perceptual cache is associated with a road sign identifier. The road sign interpretation system includes one or more controllers in electronic communication with the perceptual cache execute instructions to compute a perceptual hash of a detected road sign within a cropped image frame based on a perceptual hash function and identify a near match between the perceptual hash of the detected road sign and a selected perceptual hash value stored in the perceptual cache. In response to identifying the near match, the controllers interpret the detected road sign represented by the perceptual hash based on the road sign identifier associated with the selected perceptual hash value stored in the perceptual cache.

20 Claims, 3 Drawing Sheets

(56) References Cited

OTHER PUBLICATIONS

Busta, et al., "Deep TextSpotter: An End-to-End Trainable Scene Text Localization and Recognition Framework," 2017 IEEE International Conference on Computer Vision (ICCV), 2017, pp. 2223-2231, doi: 10.1109/ICCV.2017.242.

Cer, et al., "Universal Sentence Encoder," 2018, arXiv:1803.11175v2 [cs.CL].

Dijkstra, "A Note on Two Problems in Connexion with Graphs," Numer. Math. 1,1959, pp. 269-271, https://doi.org/10.1007/BF01386390.

Dosovigskiy, et al., "CARLA: An Open Urban Driving Simulator," 2017, pp. 1-16, arXiv:1711.03938 [cs.LG].

Girshick, et al. "Rich Feature Hierarchies for Accurate Object Detection and Semantic Segmentation," 2014 IEEE Conference on Computer Vision and Pattern Recognition, 2014, pp. 580-587, doi: 10.1109/CVPR.2014.81.

Jurafsky, et al., "Speech and Language Processing," An Introduction to Natural Language Processing, Computational Linguistics, and Speech Recognition, 2021, Chapter 6, pp. 102-132.

Liao, et al. "Real-Time Scene Text Detection with Differentiable Binarization" Proceedings of the AAAI Conference on Artificial Intelligence, Apr. 3, 2020, pp. 11474-11481, vol. 34. No. 07.

O'Shea, et al., "An Introduction to Convolutional Neural Networks," 2015, arXiv:1511.08458v2 [cs.NE].

Redmon, et al. "You Only Look Once: Unified, Real-Time Object Detection," 2016 IEEE Conference on Computer Vision and Pattern Recognition (CVPR), 2016, pp. 779-788, doi: 10.1109/CVPR.2016.91.

Schmidhuber, "Deep Learning in Neural Networks: An Overview," Neural Networks, 2015, vol. 61, pp. 85-117.

United States Patent and Trademark Office. U.S. Appl. No. 17/820,317, filed Aug. 17, 2022.

Van Der Maaten, et al., "Visualizing Data Using t-SNE,." Journal of Machine Learning Research 9, 2008, pp. 1-26.

\* cited by examiner

ROAD SIGN INTERPRETATION SYSTEM EMPLOYING PERCEPTUAL HASHING AND GEOLOCATIONAL CACHING

INTRODUCTION

The present disclosure relates to a road sign interpretation system that employs perceptual hashing and geolocational caching for interpreting information conveyed by a detected road sign.

An autonomous vehicle executes various tasks such as, but not limited to, perception, localization, mapping, path planning, decision making, and motion control. For example, an autonomous vehicle may include perception sensors such as a camera for collecting image data regarding the environment surrounding the vehicle. The autonomous vehicle may include a road sign interpretation system that relies on various computationally intensive algorithms for semantic understanding of the text displayed by the road sign such as, for example, scene text recognition (STR) algorithms and natural language processing algorithms. However, it is to be appreciated that some types of autonomous driving systems may have limited computational power, which affects the ability of the autonomous driving system to execute the algorithms in real-time to understanding the text displayed by the road signs.

Thus, while road sign interpretation systems for autonomous vehicles achieve their intended purpose, there is a need in the art for an improved approach for interpreting road signs.

SUMMARY

According to several aspects, a road sign interpretation system includes a perceptual cache storing a plurality of perceptual hash values that each correspond to image data representing an individual road sign, where each perceptual hash value is associated with a road sign identifier indicating information conveyed by the individual road sign. The road sign interpretation system also includes one or more controllers in electronic communication with the perceptual cache. The one or more controllers execute instructions to receive image data representative of a surrounding environment, where the image data includes a plurality of image frames. The one or more controllers create a cropped image frame based on the image data, where the cropped image frame includes a detected road sign located within an image frame of the image data. The one or more controllers compute a perceptual hash of the detected road sign within cropped image frame based on a perceptual hash function. The one or more controllers compare the perceptual hash of the detected road sign with the plurality of perceptual hash values stored in the perceptual cache. The one or more controllers identify a near match between the perceptual hash of the detected road sign and a selected perceptual hash value stored in the perceptual cache. In response to identifying the near match between the perceptual hash of the detected road sign and the perceptual hash value stored in the perceptual cache, the one or more controllers interpret the detected road sign represented by the perceptual hash based on the road sign identifier associated with the selected perceptual hash value stored in the perceptual cache.

In another aspect, the road sign identifier indicates information conveyed by at least one of text and symbols.

In yet another aspect, the one or more controllers create the cropped image frame by identifying the detected road sign within the image frame, identifying a location of the detected road sign within the image frame and cropping the image frame to include the location of the detected road sign.

In an aspect, the one or more controllers identify the near match when a hash distance between the perceptual hash and the selected perceptual hash value stored in the perceptual cache is less than a threshold distance value.

In another aspect, the hash distance between the perceptual hash and the selected perceptual hash value stored in the perceptual cache is expressed based on a Euclidean distance or a Hamming distance.

In yet another aspect, the one or more controllers execute instructions to in response to determining a near match between the perceptual hash of the detected road sign and the plurality of perceptual hash values stored in the perceptual cache does not exist, classify the detected road sign as either a static road sign or a variable message sign.

In an aspect, the one or more controllers execute instructions to in response to determining the detected road sign is a variable message sign, interpret the detected road sign based on real-time sign interpretation and natural language processing algorithms.

In another aspect, the one or more controllers execute instructions to in response to determining the detected road sign is the static road sign, determine a geographic location of the detected road sign, where the geographic location is expressed in world coordinates.

In an aspect, the road sign interpretation system includes a geolocational cache in electronic communication with the one or more controllers, where the geolocational cache includes map data annotated with a plurality of road sign points that each represent the individual road sign, and each road sign point indicates a geographic location and the road sign identifier for the individual road sign.

In another aspect, the one or more controllers execute instructions to compare the geographic location of the detected road sign with the geographic location of each of the plurality of road sign points that are part of the map data stored in the geolocational cache to identify a nearest match, where the nearest match identifies a road sign point having the shortest Euclidean distance measured from the geographic location of the detected road sign when compared with remaining road sign points stored in the geolocational cache.

In yet another aspect, the one or more controllers execute instructions to compare the shortest Euclidean distance of the road sign point identified by the nearest match with a predetermined radius from the geographic location of the detected road sign, and in response to determining the shortest Euclidean distance of the road sign point identified by the nearest match is less than the predetermined radius, interpret the detected road sign based on the road sign identifier associated with the road sign point positioned closest to the geographic location of the detected road sign.

In an aspect, a method of interpreting road signs by a road sign interpretation system for a vehicle is disclosed. The method includes receiving, by one or more controllers, image data from one or more cameras, where the image data is representative of a surrounding environment of the vehicle and the image data includes a plurality of image frames. The method includes creating a cropped image frame based on the image data, where the cropped image frame includes a detected road sign located within an image frame of the image data. The method includes computing a perceptual hash of the detected road sign within cropped image frame based on a perceptual hash function. The method includes comparing the perceptual hash of the detected road sign with a plurality of perceptual hash values stored in a perceptual cache, where the plurality of perceptual hash values each correspond to image data representing an individual road sign, and wherein perceptual hash value stored in the perceptual cache is associated with a road sign identifier indicating information conveyed by the individual road sign. The method includes identifying a near match between the perceptual hash of the detected road sign and a selected perceptual hash value stored in the perceptual cache. Finally, in response to identifying the near match between the perceptual hash of the detected road sign and the perceptual hash value stored in the perceptual cache, the method includes interpreting the detected road sign represented by the perceptual hash based on the road sign identifier associated with the selected perceptual hash value stored in the perceptual cache.

In an aspect, in response to determining a near match between the perceptual hash of the detected road sign and the plurality of perceptual hash values stored in the perceptual cache does not exist, the method includes classifying the detected road sign as either a static road sign or a variable message sign.

In another aspect, in response to determining the detected road sign is a variable message sign, the method includes interpreting the detected road sign based on real-time sign interpretation and natural language processing algorithms.

In yet another aspect, in response to determining the detected road sign is the static road sign, the method includes determining a geographic location of the detected road sign, where the geographic location is expressed in world coordinates.

In an aspect, the one or more controllers are in electronic communication with a geolocational cache including map data annotated with a plurality of road sign points that each represent the individual road sign, wherein each road sign point indicates a geographic location and the road sign identifier for the individual road sign. The method further includes comparing the geographic location of the detected road sign with a geographic location of each the plurality of road sign points that are part of map data stored in a geolocational cache to identify a nearest match, where the nearest match identifies a road sign point having the shortest Euclidean distance measured from the geographic location of the detected road sign when compared with remaining road sign points stored in the geolocational cache.

In another aspect, the method further includes comparing the shortest Euclidean distance of the road sign point identified by the nearest match with a predetermined radius from the geographic location of the detected road sign. In response to determining the shortest Euclidean distance of the road sign point identified by the nearest match is less than the predetermined radius, the method includes interpreting the detected road sign based on the road sign identifier associated with the road sign point positioned closest to the geographic location of the detected road sign.

In an aspect, a road sign interpretation system for a vehicle is disclosed, and includes one or more cameras capturing image data of a surrounding environment of the vehicle, where the image data includes a plurality of image frames, a perceptual cache storing a plurality of perceptual hash values that each correspond to image data representing an individual road sign, where each perceptual hash value is associated with a road sign identifier indicating information conveyed by the individual road sign, a geolocational cache including map data annotated with a plurality of road sign points that each represent an individual road sign, where each road sign point indicates a geographic location and the road sign identifier for the individual road sign, and one or more controllers in electronic communication with the geolocational cache, the perceptual cache, and the one or more cameras. The one or more controllers execute instructions to receive the image data from the one or more cameras. The one or more controllers create a cropped image frame based on the image data, where the cropped image frame includes a detected road sign located within an image frame of the image data. The one or more controllers compute a perceptual hash of the detected road sign within cropped image frame based on a perceptual hash function. The one or more controllers compare the perceptual hash of the detected road sign with the plurality of perceptual hash values stored in the perceptual cache. The one or more controllers identify a near match between the perceptual hash of the detected road sign and a selected perceptual hash value stored in the perceptual cache. In response to identifying the near match between the perceptual hash of the detected road sign and the perceptual hash value stored in the perceptual cache, the one or more controllers interpret the detected road sign represented by the perceptual hash based on the road sign identifier associated with the selected perceptual hash value stored in the perceptual cache. In response to determining a near match between the perceptual hash of the detected road sign and the plurality of perceptual hash values stored in the perceptual cache does not exist, the one or more controllers classify the detected road sign as either a static road sign or a variable message sign. In response to determining the detected road sign is a variable message sign, the one or more controllers interpret the detected road sign based on natural language processing algorithms. In response to determining the detected road sign is the static road sign, the one or more controllers determine a geographic location of the detected road sign, where the geographic location is expressed in world coordinates. The one or more controllers compare the geographic location of the detected road sign with the geographic location of each of the plurality of road sign points that are part of the map data stored in the geolocational cache to identify a nearest match, where the nearest match identifies a road sign point having the shortest Euclidean distance measured from the geographic location of the detected road sign when compared with remaining road sign points stored in the geolocational cache. The one or more controllers compare the shortest Euclidean distance of the road sign point identified by the nearest match with a predetermined radius from the geographic location of the detected road sign. In response to determining the shortest Euclidean distance of the road sign point identified by the nearest match is less than the predetermined radius, the one or more controllers interpret the detected road sign based on the road sign identifier associated with the road sign point positioned closest to the geographic location of the detected road sign.

In another aspect, the road sign identifier indicates information conveyed by at least one of text and symbols, and the text and the symbols are displayed by the detected road sign.

In yet another aspect, the one or more controllers create the cropped image frame by identifying the detected road sign within the image frame, identifying a location of the detected road sign within the image frame, and cropping the image frame to include the location of the detected road sign.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
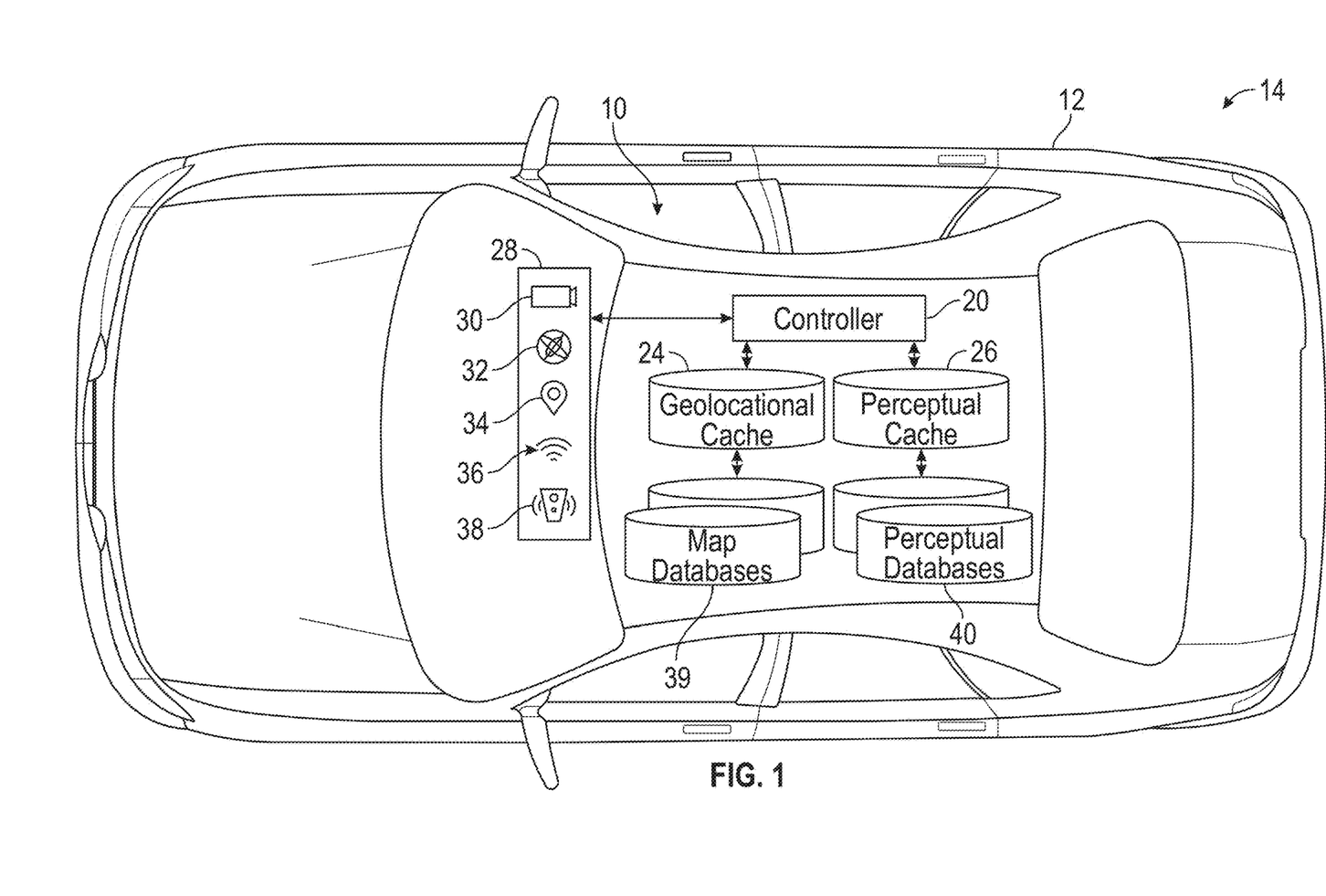
FIG. 1 is a schematic diagram of a vehicle including the disclosed road sign interpretation system including one or more controllers, according to an exemplary embodiment.

Referring to FIG. 1, an exemplary road sign interpretation system 10 for a vehicle 12 is illustrated. It is to be appreciated that the vehicle 12 may be any type of vehicle such as, but not limited to, a sedan, truck, sport utility vehicle, van, or motor home. In one embodiment, the road sign interpretation system 10 is part of an automated driving system (ADS) or an advanced driver assistance system (ADAS) for assisting a driver with steering, braking, and/or accelerating. It is to be appreciated that while FIG. 1 illustrates the road sign interpretation system 10 as part of a vehicle, the figures are merely exemplary in nature. The road sign interpretation system 10 may be used in other object detection systems as well and is not limited to vehicular applications. For example, in another embodiment, the road sign interpretation system 10 may be part of an object detection application installed upon a smartphone or augmented reality (AR) glasses.

The road sign interpretation system 10 includes one or more controllers 20 in electronic communication with geolocational cache 24, a perceptual cache 26, and plurality of perception sensors 28. As explained below, the disclosed road sign interpretation system 10 employs perceptual hashing or geolocational caching for interpreting information conveyed by a detected road sign. In embodiments, the road sign interpretation system 10 employs computer vision techniques and natural language processing algorithms for interpreting the information conveyed by the detected road sign and are described in U.S. application Ser. No. 17/820,317 filed on Aug. 17, 2022, which is herein incorporated by reference in its entirety. The detected road sign is erected at the side of or above a road to provide information to the road users. The information may include, for example, a specific name of a street or the town the vehicle 12 is traveling along or instructions such as, for example, stopping at a specific location. Some examples of road signs include, but are not limited to, stop signs, street signs, traffic control signs, and speed limit signs.

The geolocational cache 24 includes map data of an area located within a predefined distance from a current location of the vehicle 12 (or the road sign interpretation system 10), where the map data is annotated with a plurality of road sign points that each represent an individual road sign. The predefined distance represents a region where the vehicle 12 travels. Each road sign point is associated with a geographic location and a road sign identifier for an individual road sign. The road sign identifier indicates the information conveyed by the individual road sign. Specifically, the road sign identifier indicates the information that is conveyed by text, symbols, or both text and symbols that are displayed by an individual road sign. For example, if the individual road sign is a yield sign that includes the text stating "yield", then the road sign identifier indicates the individual road sign is a yield sign. The perceptual cache 26 stores a plurality of perceptual hash values, where each perceptual hash value is derived from image data representative of a road sign. Each perceptual hash value stored in the perceptual cache 26 is associated with a road sign identifier indicating the information conveyed by an individual road sign.

The plurality of perception sensors 28 include one or more cameras 30, an inertial measurement unit (IMU) 32, a global positioning system (GPS) 34, radar 36, and LiDAR 38, however, is to be appreciated that additional sensors may be used as well. The one or more controllers 20 receive image data of a surrounding environment 14 of the vehicle 12 from the one or more cameras 30, where the image data includes a plurality of image frames. The one or more controllers 20 monitor the image data captured by the one or more cameras 30 for a road sign located in the surrounding environment 14 of the vehicle 12.

The geolocational cache 24 is in communication with one or more map databases 39, and the perceptual cache 26 is in communication with one or more perceptual databases 40. The one or more map databases 39 store the map data annotated with the plurality of road sign points located in a specific geographical region. The one or more perceptual databases 40 store a plurality of perceptual hash values that each correspond to a road sign located in the specific geographical region. In the example as shown in FIG. 1, the one or more map databases 39 and the one or more perceptual databases 40 are locally stored on the vehicle 12, however, it is to be appreciated that the databases 39, 40 may be stored remotely in a location that is part of a cloud-based network instead, where the databases 39, 40 may employ crowdsourced information from numerous vehicles.

The databases 39, 40 store information related to a specific geographical region, which encompass the predefined distance from the current location of the vehicle 12 that is stored by the caches 24, 26. That is, the geolocational cache 24 stores a subset of the map data stored in the one or more map databases 39, while the perceptual cache 26 stores a subset of the perceptual hash values stored in the one or more perceptual databases 40. It is to be appreciated that the perceptual cache 26 is provided to increase data retrieval performance by storing a subset of the perceptual hash that is stored by the one or more databases 40.

Figure 2:
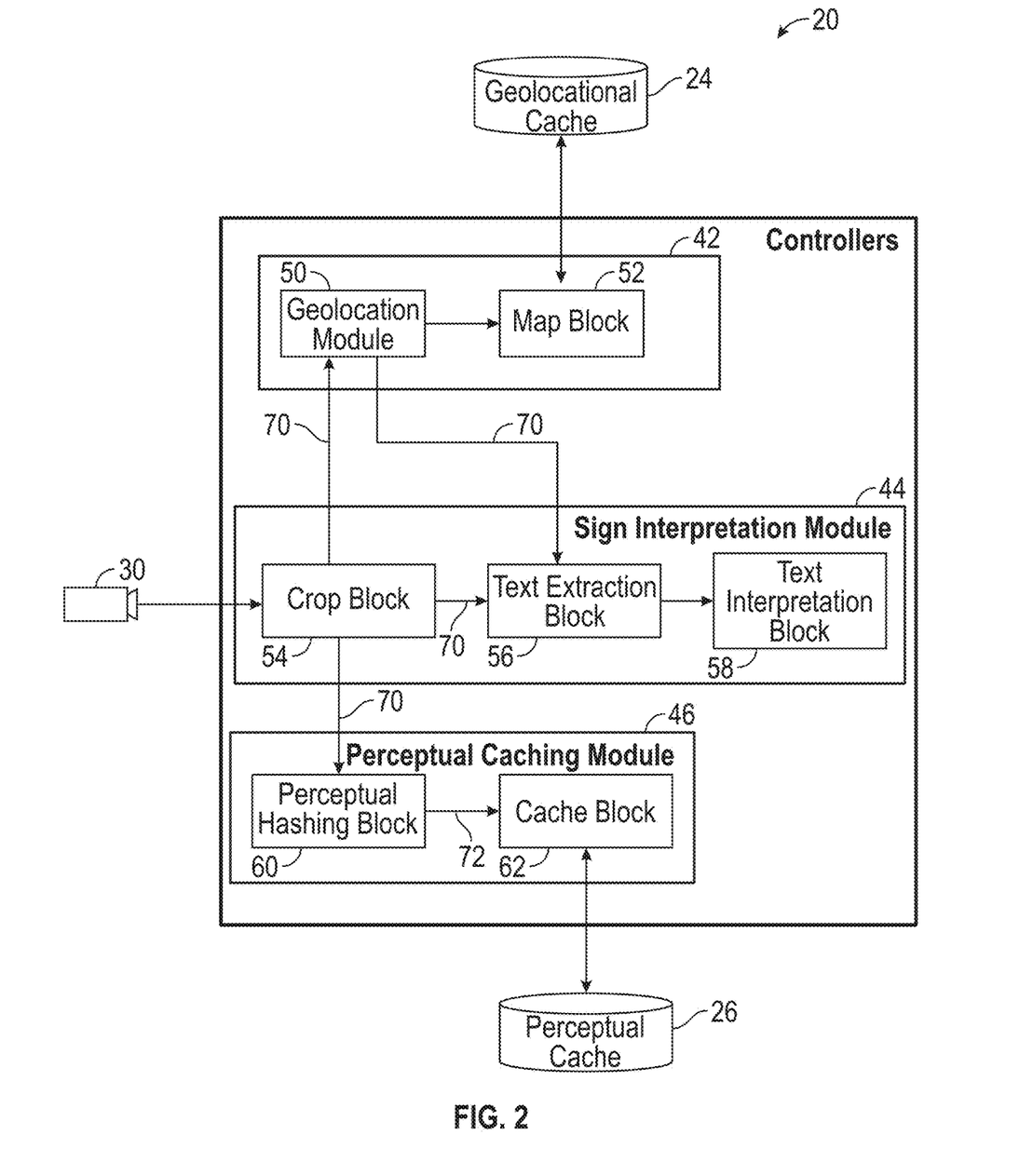
FIG. 2 is a block diagram of the one or more controllers shown in FIG. 1, according to an exemplary embodiment.

FIG. 2 is a block diagram of the one or more controllers 20 shown in FIG. 1, where the one or more controllers 20 include a geolocation module 42, a real-time sign interpretation module 44, and a perceptual caching module 46. The geolocation module 42 includes a three-dimensional position reconstruction block 50 and a map block 52. The real-time sign interpretation module 44 includes a detection and crop block 54, a text extraction block 56, and a text interpretation block 58. The perceptual caching module 46 includes a perceptual hashing block 60 and a cache block 62. The detection and crop block 54 of the real-time sign interpretation module 44 receives the image data representative of the surrounding environment 14 (FIG. 1) from the one or more cameras 30 as input. The detection and crop block 54 creates a cropped image frame 70 by first identifying a detected road sign within one of the image frames of the image data, identifying a location of the detected road sign within the image frame, and cropping the image frame to include the location of the detected road sign. The detection and crop block 54 may employ any number of techniques for identifying the detected road sign within the image frame such as, for example, convolutional neural networks (CNN). The cropped image frame 70 is then sent to the perceptual hashing block 60 of the perceptual caching module 46.

The perceptual hashing block 60 of the perceptual caching module 46 receives the cropped image frame 70 as input and computes a perceptual hash 72 of the detected road sign within the cropped image frame 70 based on a perceptual hash function. Any type of perceptual hashing function may be employed such as, for example, CNN or wavelet based perceptual hashing functions. It is to be appreciated that the perceptual hash 72 of the detected road sign within of the cropped image frame 70 is chosen to be invariant to affine transformations and rotations. The perceptual hash 72 of the detected road sign is represented as a fixed-size string of alphanumeric characters. The cache block 62 of the perceptual caching module 46 receives the perceptual hash 72 of the detected road sign as input and compares the perceptual hash 72 of the detected road sign with the plurality of perceptual hash values stored in the perceptual cache 26 for a near match between the perceptual hash 72 of the detected road sign and a selected perceptual hash value stored in the perceptual cache 26.

It is to be appreciated unlike conventional cryptographic hashing algorithms that generate distinct hash values for slightly changed inputs, perceptual hashing may tolerate small perturbations. Therefore, similar-looking images that have relatively inconsequential differences between them will result in similar perceptual hash values. For example, the perceptual hash values "001234ABC553" and "00123ABC558" may both represent a stop sign. Accordingly, the near match accounts for differences in the alphanumeric characters between the perceptual hash 72 of the detected road sign and the perceptual hash values stored in the perceptual cache 26 that are observed between similar-looking images. Specifically, a near match is identified when a hash distance between the perceptual hash 72 of the detected road sign and the selected perceptual hash value stored in the perceptual cache 26 is less than a threshold distance value. The threshold distance value is selected empirically to ensure that the near match identifies two road signs that convey identical information. The hash distance between the perceptual hash 72 of the detected road sign and the selected perceptual hash value stored in the perceptual cache 26 is expressed based on any number of approaches such as, for example, a Euclidean distance or a Hamming distance.

In response to identifying a near match between the perceptual hash 72 of the detected road sign and the selected perceptual hash value stored in the perceptual cache 26, the cache block 62 of the perceptual caching module 46 interprets the detected road sign based on the road sign identifier associated with the selected perceptual hash value stored in the perceptual cache 26. For example, if the selected perceptual hash value stored in the perceptual cache 26 includes a road sign identifier indicating a stop sign, the cache block 62 of the perceptual caching module 46 interprets the perceptual hash 72 of the detected road sign as a stop sign.

In response to determining a near match between the perceptual hash 72 of the detected road sign and the plurality of perceptual hash values stored in the perceptual cache 26 does not exist, the detection and crop block 54 of the real-time sign interpretation module 44 sends the cropped image frame 70 to the three-dimensional position reconstruction block 50 of the geolocation module 42. In the alternative, the detection and crop block 54 of the real-time sign interpretation module 44 sends the cropped image frame 70 to the text extraction block 56 of the real-time sign interpretation module 44. As explained below, the real-time sign interpretation module 44 interprets the detected road sign based on scene recognition text (STR) and natural language processing algorithms, where STR algorithms are more detailed than optical character recognition (OCR) algorithms and are used in the field. Once the detected sign is interpreted, the perceptual hash 72 of the detected road sign is saved in the perceptual cache 26 and the perceptual database 40 for future reference.

The three-dimensional position reconstruction block 50 of the geolocation module 42 first analyzes the cropped image frame 70 to classify the detected road sign as either a static road sign or a variable message sign. A variable message sign is a digital road sign that may be updated in real-time. In response to determining the detected road sign is a variable message sign, the real-time sign interpretation module 44 interprets the detected road sign based on natural language processing algorithms, which are described below.

In response to determining the detected road sign is a static road sign, the three-dimensional position reconstruction block 50 of the geolocation module 42 determines a geographic location of the detected road sign expressed in world coordinates. The three-dimensional position reconstruction block 50 of the geolocation module 42 determines the geographic location of the detected road sign based on vehicle pose information received by the GPS 34 and a relative position of the detected road sign with respect to the vehicle 12. The relative position of the detected road sign may be determined based on structure from motion imaging techniques or data from the radar 36 or LiDAR 38 (FIG. 1).

The three-dimensional position reconstruction block 50 then sends the geographic location of the detected road sign to the map block 52 of the geolocation module 42. The map block 52 compares the geographic location of the detected road sign with the geographic location of the plurality of road sign points that are part of the map data stored in the geolocational cache 24 to identify a nearest match. The nearest match identifies a road sign point positioned closest to the geographic location of the detected road sign when compared to the remaining road sign points stored in the geolocational cache 24. In other words, the nearest match identifies a road sign point having the shortest Euclidean distance measured from the geographic location of the detected road sign when compared with the remaining road sign points stored in the geolocational cache 24.

The map block 52 also compares the shortest Euclidean distance of the road sign point identified by the nearest match with a predetermined radius from the geographic location of the detected road sign as well. The predetermined radius is selected to ensure that the road sign point identified by the nearest match is representative of the detected road sign, and in one embodiment may range from about one to two meters. In response to determining the shortest Euclidean distance of the road sign point identified by the nearest match is less than the predetermined radius, the map block 52 of the geolocation module 42 interprets the detected road sign based on the road sign identifier associated with the road sign point positioned closest to the geographic location of the detected road sign. Otherwise, the real-time sign interpretation module 44 interprets the detected road sign based on real-time sign interpretation and natural language processing algorithms, which are explained below. Once the detected road sign is interpreted, the road sign interpretation system 10 saves a new road sign point in the geolocational cache 24 that is indicative of the detected road sign as well.

In an embodiment, the map block 52 also checks the road sign point closest in distance to determine a date when the road sign point was introduced to the geolocational cache 24. The date of the road sign point is compared with a threshold length of time to ensure the road sign point represents relatively recent data. In one non-limiting example, the threshold length of time is several months, however, it is to be appreciated that the threshold length of time may be adjusted. In response to determining the date of the road sign is more recent than the threshold length of time, the map block 52 considers the road sign point positioned closest to the geographic location of the detected road sign as the nearest match. In response to determining the date of the road sign is less recent than the threshold date, the detection and crop block 54 of the real-time sign interpretation module 44 sends the cropped image frame 70 to the text extraction block 56 of the real-time sign interpretation module 44 to interpret the detected road sign based on real-time sign interpretation and natural language processing algorithms.

The real-time sign interpretation module 44 interprets the cropped image frame 70 based on real-time sign interpretation and natural language processing algorithms. Specifically, the text extraction block 56 converts text located within the cropped image frame 70 into a machine-readable text using any approach such as, for example, scene text recognition (STR) algorithms. The machine-readable text is then sent to the text interpretation block 58, which interprets the machine-readable text based on any number of natural language processing algorithms to interpret the text displayed by the detected road sign.

Figure 3:
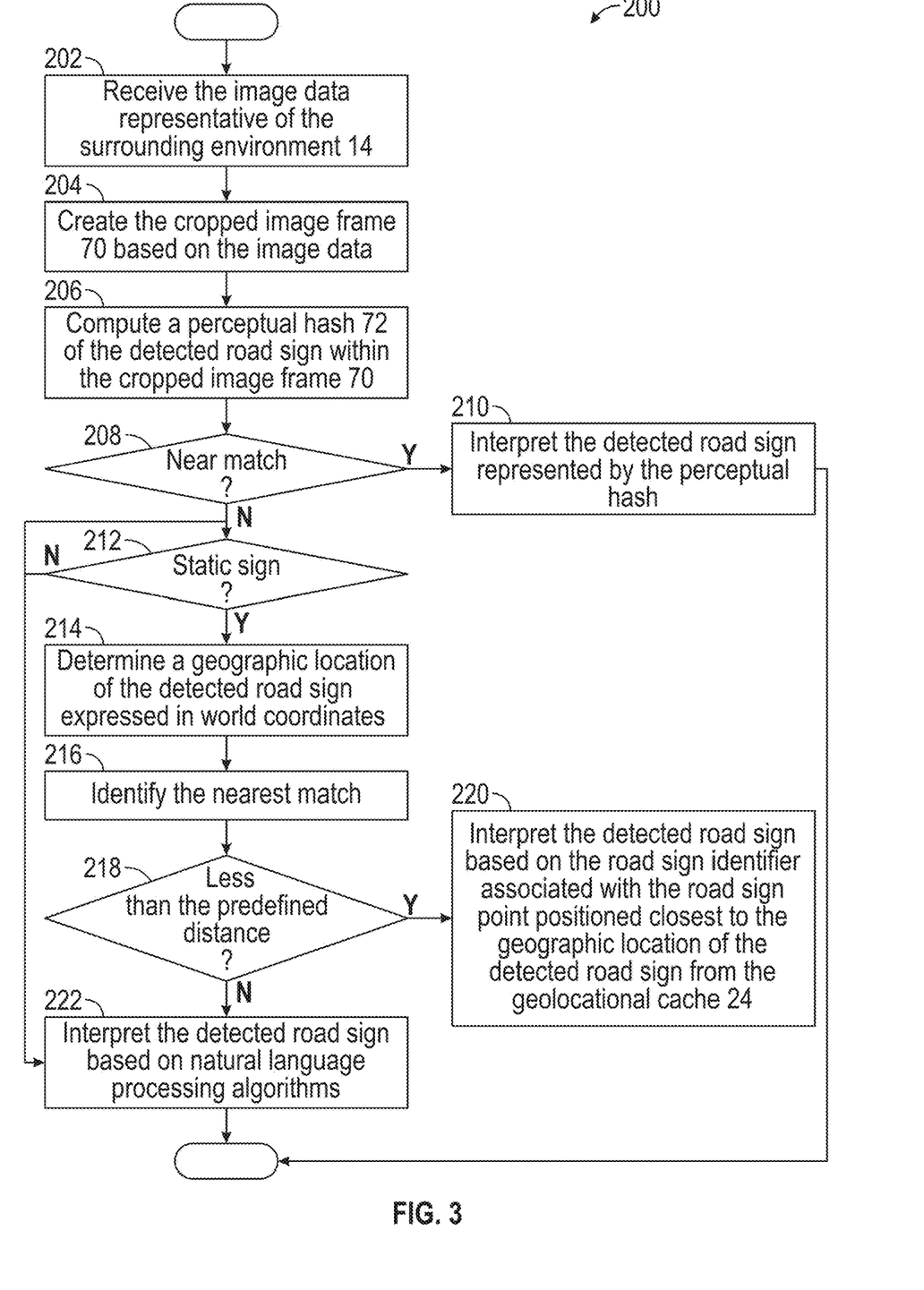
FIG. 3 is a process flow diagram illustrating a method for interpreting information conveyed by a detected road sign by the road sign interpretation system, according to an exemplary embodiment.

FIG. 3 is an exemplary process flow diagram illustrating a method 200 for interpreting road signs by the road sign interpretation system 10. Referring generally to FIGS. 1-3, the method 200 may begin at block 202. In block 202, the detection and crop block 54 of the real-time sign interpretation module 44 receives the image data representative of the surrounding environment 14 (FIG. 1) from the one or more cameras 30 as input. The method 200 may then proceed to block 204.

In block 204, the detection and crop block 54 of the real-time sign interpretation module 44 creates the cropped image frame 70 based on the image data. The cropped image frame 70 includes the detected road sign located within one of the image frames of the image data. The method 200 may then proceed to block 206.

In block 206, the perceptual hashing block 60 of the perceptual caching module 46 receives the cropped image frame 70 as input and computes a perceptual hash 72 of the detected road sign within the cropped image frame 70 based on a perceptual hash function. The method 200 may then proceed to decision block 208.

In decision block 208, the cache block 62 of the perceptual caching module 46 compares the perceptual hash of the detected road sign with the plurality of perceptual hash values stored in the perceptual cache 26. If the cache block 62 identifies a close enough or near match between the perceptual hash of the detected road sign and a selected perceptual hash value stored in the perceptual cache 26, the method 200 proceeds to block 210.

In block 210, in response to identifying the near match between the perceptual hash of the detected road sign and the perceptual hash value stored in the perceptual cache, the cache block 62 of the perceptual caching module 46 interprets the detected road sign represented by the perceptual hash based on the road sign identifier associated with the selected perceptual hash value stored in the perceptual cache 26. The method 200 may then terminate.

Referring to block 208, in response to determining a near match between the perceptual hash of the detected road sign and the plurality of perceptual hash values stored in the perceptual cache 26 does not exist, the detection and crop block 54 of the real-time sign interpretation module 44 sends the cropped image frame 70 to the three-dimensional position reconstruction block 50 of the geolocation module 42, and the method proceeds to decision block 212. In the alternative, the detection and crop block 54 of the real-time sign interpretation module 44 sends the cropped image frame 70 to the text extraction block 56 of the real-time sign interpretation module 44, and the method proceeds to block 222.

In decision block 212, the three-dimensional position reconstruction block 50 of the geolocation module 42 analyzes the cropped image frame 70 to classify the detected road sign as either a static road sign or a variable message sign. If the detected road sign is not a static road sign, (i.e., if the detected road sign is a variable message sign), the method proceeds to block 222. If the detected road sign is a static sign, the method proceeds to block 214.

In block 214, in response to determining the detected road sign is a static road sign, the three-dimensional position reconstruction block 50 determines a geographic location of the detected road sign expressed in world coordinates. The method 200 may then proceed to block 216.

In block 216, the map block 52 compares the geographic location of the detected road sign with the geographic location of the plurality of road sign points that are part of the map data stored in the geolocational cache 24 to identify the nearest match. As mentioned above, the nearest match identifies a road sign point having the shortest Euclidean distance measured from the geographic location of the detected road sign when compared with remaining road sign points stored in the geolocational cache 24. The method 200 may then proceed to decision block 218.

In decision block 218, the map block 52 compares the shortest Euclidean distance of the road sign point identified by the nearest match with the predefined radius from the geographic location of the detected road sign. In response to determining the shortest Euclidean distance of the road sign point identified by the nearest match is less than the predefined radius, the method proceeds to block 220. In block 220, the map block 52 interprets the detected road sign based on the road sign identifier associated with the road sign point positioned closest to the geographic location of the detected road sign from the geolocational cache 24. Otherwise, the method 200 proceeds to block 222.

In block 222, the real-time sign interpretation module 44 interprets the detected road sign based on natural language processing algorithms. The method 200 may then terminate.

Referring generally to the figures, the disclosed road sign interpretation system provides various technical effects and benefits. Specifically, the road sign interpretation system on average reduces the computational load that is typically experienced by systems when executing real-time sign interpretation and natural language processing algorithms by identifying detected road signs based on perceptual hash values or a geographic location of the detected sign saved in cache memory. Furthermore, in the event the detected road sign is unable to be interpreted based on a perceptual hash value or a geographic location of the detected road sign, the perceptual hash value or geographic location is saved in cache memory for future use. Thus, road signs that have been detected in the past do not require intensive computations to be interpreted as well. Finally, it is to be appreciated that the disclosed road sign interpretation system is resilient to adverse weather conditions such as rain, snow, or fog that affect the quality of the image data collected by cameras as well due to the resilience of the hashing methods.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A road sign interpretation system, comprising:
   a perceptual cache storing a plurality of perceptual hash values that each correspond to image data representing an individual road sign, wherein each perceptual hash value is associated with a road sign identifier indicating information conveyed by the individual road sign;
   one or more perceptual databases, wherein the perceptual cache is in communication with the one or more perceptual databases that store a plurality of perceptual hash values that each correspond to a road sign located in a specific geographical region, and wherein perceptual cache stores a subset of the perceptual hash values stored in the one or more perceptual databases; and
   one or more controllers in electronic communication with the perceptual cache, the one or more controllers executing instructions to:
   receive image data representative of a surrounding environment, wherein the image data includes a plurality of image frames;
   create a cropped image frame based on the image data, wherein the cropped image frame includes a detected road sign located within an image frame of the image data;
   compute a perceptual hash of the detected road sign within cropped image frame based on a perceptual hash function;
   compare the perceptual hash of the detected road sign with the plurality of perceptual hash values stored in the perceptual cache;
   identify a near match between the perceptual hash of the detected road sign and a selected perceptual hash value stored in the perceptual cache; and
   in response to identifying the near match between the perceptual hash of the detected road sign and the perceptual hash value stored in the perceptual cache, interpret the detected road sign represented by the perceptual hash based on the road sign identifier associated with the selected perceptual hash value stored in the perceptual cache, wherein interpreting the detected road sign based on the road sign identifier associated with the selected perceptual hash value reduces computational load experienced by the one or more controllers when compared to executing real-time sign interpretation and natural language processing algorithms.

2. The road sign interpretation system of claim 1, wherein the road sign identifier indicates information conveyed by at least one of text and symbols.

3. The road sign interpretation system of claim 1, wherein the one or more controllers create the cropped image frame by:
   identifying the detected road sign within the image frame;
   identifying a location of the detected road sign within the image frame; and
   cropping the image frame to include the location of the detected road sign.

4. The road sign interpretation system of claim 1, wherein the one or more controllers identify the near match when a hash distance between the perceptual hash and the selected perceptual hash value stored in the perceptual cache is less than a threshold distance value.

5. The road sign interpretation system of claim 4, wherein the hash distance between the perceptual hash and the selected perceptual hash value stored in the perceptual cache is expressed based on a Euclidean distance or a Hamming distance.

6. The road sign interpretation system of claim 1, wherein the one or more controllers execute instructions to:
   in response to determining a near match between the perceptual hash of the detected road sign and the plurality of perceptual hash values stored in the perceptual cache does not exist, classify the detected road sign as either a static road sign or a variable message sign.

7. The road sign interpretation system of claim 6, wherein the one or more controllers execute instructions to:
   in response to determining the detected road sign is a variable message sign, interpret the detected road sign based on the real-time sign interpretation and natural language processing algorithms.

8. The road sign interpretation system of claim 6, wherein the one or more controllers execute instructions to:
   in response to determining the detected road sign is the static road sign, determine a geographic location of the detected road sign, wherein the geographic location is expressed in world coordinates.

9. The road sign interpretation system of claim 8, further comprising a geolocational cache in electronic communication with the one or more controllers, wherein the geolocational cache includes map data annotated with a plurality of road sign points that each represent the individual road sign, and each road sign point indicates a geographic location and the road sign identifier for the individual road sign.

10. The road sign interpretation system of claim 9, wherein the one or more controllers execute instructions to:
    compare the geographic location of the detected road sign with the geographic location of each of the plurality of road sign points that are part of the map data stored in the geolocational cache to identify a nearest match, wherein the nearest match identifies a road sign point having the shortest Euclidean distance measured from the geographic location of the detected road sign when compared with remaining road sign points stored in the geolocational cache.

11. The road sign interpretation system of claim 10, wherein the one or more controllers execute instructions to:
compare the shortest Euclidean distance of the road sign point identified by the nearest match with a predetermined radius from the geographic location of the detected road sign; and
in response to determining the shortest Euclidean distance of the road sign point identified by the nearest match is less than the predetermined radius, interpret the detected road sign based on the road sign identifier associated with the road sign point positioned closest to the geographic location of the detected road sign.

12. A method of interpreting road signs by a road sign interpretation system for a vehicle, the method comprising:
receiving, by one or more controllers, image data from one or more cameras, wherein the image data is representative of a surrounding environment of the vehicle and the image data includes a plurality of image frames;
creating a cropped image frame based on the image data, wherein the cropped image frame includes a detected road sign located within an image frame of the image data;
computing a perceptual hash of the detected road sign within cropped image frame based on a perceptual hash function;
comparing the perceptual hash of the detected road sign with a plurality of perceptual hash values stored in a perceptual cache, wherein the plurality of perceptual hash values each correspond to image data representing an individual road sign, and wherein perceptual hash value stored in the perceptual cache is associated with a road sign identifier indicating information conveyed by the individual road sign, and wherein the perceptual cache is in communication with one or more perceptual databases that store a plurality of perceptual hash values that each correspond to a road sign located in a specific geographical region, and wherein perceptual cache stores a subset of the perceptual hash values stored in the one or more perceptual databases;
identifying a near match between the perceptual hash of the detected road sign and a selected perceptual hash value stored in the perceptual cache; and
in response to identifying the near match between the perceptual hash of the detected road sign and the perceptual hash value stored in the perceptual cache, interpreting the detected road sign represented by the perceptual hash based on the road sign identifier associated with the selected perceptual hash value stored in the perceptual cache, wherein interpreting the detected road sign based on the road sign identifier associated with the selected perceptual hash value reduces computational load experienced by the one or more controllers when compared to executing real-time sign interpretation and natural language processing algorithms.

13. The method of claim 12, wherein the method further comprises:
in response to determining a near match between the perceptual hash of the detected road sign and the plurality of perceptual hash values stored in the perceptual cache does not exist, classifying the detected road sign as either a static road sign or a variable message sign.

14. The method of claim 13, wherein the method further comprises:
in response to determining the detected road sign is a variable message sign, interpreting the detected road sign based on the real-time sign interpretation and natural language processing algorithms.

15. The method of claim 13, wherein the method further comprises:
in response to determining the detected road sign is the static road sign, determining a geographic location of the detected road sign, wherein the geographic location is expressed in world coordinates.

16. The method of claim 15, wherein the one or more controllers are in electronic communication with a geolocational cache including map data annotated with a plurality of road sign points that each represent the individual road sign, wherein each road sign point indicates a geographic location and the road sign identifier for the individual road sign, and wherein the method further comprises:
comparing the geographic location of the detected road sign with a geographic location of each the plurality of road sign points that are part of map data stored in a geolocational cache to identify a nearest match, wherein the nearest match identifies a road sign point having the shortest Euclidean distance measured from the geographic location of the detected road sign when compared with remaining road sign points stored in the geolocational cache.

17. The method of claim 16, wherein the method further comprises:
comparing the shortest Euclidean distance of the road sign point identified by the nearest match with a predetermined radius from the geographic location of the detected road sign; and
in response to determining the shortest Euclidean distance of the road sign point identified by the nearest match is less than the predetermined radius, interpreting the detected road sign based on the road sign identifier associated with the road sign point positioned closest to the geographic location of the detected road sign.

18. A road sign interpretation system for a vehicle, comprising:
one or more cameras capturing image data of a surrounding environment of the vehicle, wherein the image data includes a plurality of image frames;
a perceptual cache storing a plurality of perceptual hash values that each correspond to image data representing an individual road sign, wherein each perceptual hash value is associated with a road sign identifier indicating information conveyed by the individual road sign;
one or more perceptual databases, wherein the perceptual cache is in communication with the one or more perceptual databases that store a plurality of perceptual hash values that each correspond to a road sign located in a specific geographical region, and wherein perceptual cache stores a subset of the perceptual hash values stored in the one or more perceptual databases;
a geolocational cache including map data annotated with a plurality of road sign points that each represent an individual road sign, wherein each road sign point indicates a geographic location and the road sign identifier for the individual road sign; and
one or more controllers in electronic communication with the geolocational cache, the perceptual cache, and the one or more cameras, the one or more controllers executing instructions to:
receive the image data from the one or more cameras;

create a cropped image frame based on the image data, wherein the cropped image frame includes a detected road sign located within an image frame of the image data;

compute a perceptual hash of the detected road sign within cropped image frame based on a perceptual hash function;

compare the perceptual hash of the detected road sign with the plurality of perceptual hash values stored in the perceptual cache;

identify a near match between the perceptual hash of the detected road sign and a selected perceptual hash value stored in the perceptual cache;

in response to identifying the near match between the perceptual hash of the detected road sign and the perceptual hash value stored in the perceptual cache, interpret the detected road sign represented by the perceptual hash based on the road sign identifier associated with the selected perceptual hash value stored in the perceptual cache;

in response to determining a near match between the perceptual hash of the detected road sign and the plurality of perceptual hash values stored in the perceptual cache does not exist, classify the detected road sign as either a static road sign or a variable message sign;

in response to determining the detected road sign is a variable message sign, interpret the detected road sign based on natural language processing algorithms;

in response to determining the detected road sign is the static road sign, determine a geographic location of the detected road sign, wherein the geographic location is expressed in world coordinates;

compare the geographic location of the detected road sign with the geographic location of each of the plurality of road sign points that are part of the map data stored in the geolocational cache to identify a nearest match, wherein the nearest match identifies a road sign point having the shortest Euclidean distance measured from the geographic location of the detected road sign when compared with remaining road sign points stored in the geolocational cache;

compare the shortest Euclidean distance of the road sign point identified by the nearest match with a predetermined radius from the geographic location of the detected road sign; and in response to determining the shortest Euclidean distance of the road sign point identified by the nearest match is less than the predetermined radius, interpret the detected road sign based on the road sign identifier associated with the road sign point positioned closest to the geographic location of the detected road sign, wherein interpreting the detected road sign based on the road sign identifier associated with the selected perceptual hash value reduces computational load experienced by the one or more controllers when compared to executing real-time sign interpretation and natural language processing algorithms.

19. The road sign interpretation system of claim 18, wherein the road sign identifier indicates information conveyed by at least one of text and symbols, and the text and the symbols are displayed by the detected road sign.

20. The road sign interpretation system of claim 18, wherein the one or more controllers create the cropped image frame by:
identifying the detected road sign within the image frame;
identifying a location of the detected road sign within the image frame; and
cropping the image frame to include the location of the detected road sign.

* * * * *